Jan. 7, 1969   F. T. IRGENS   3,420,041
LAWN MOWER
Filed July 12, 1965
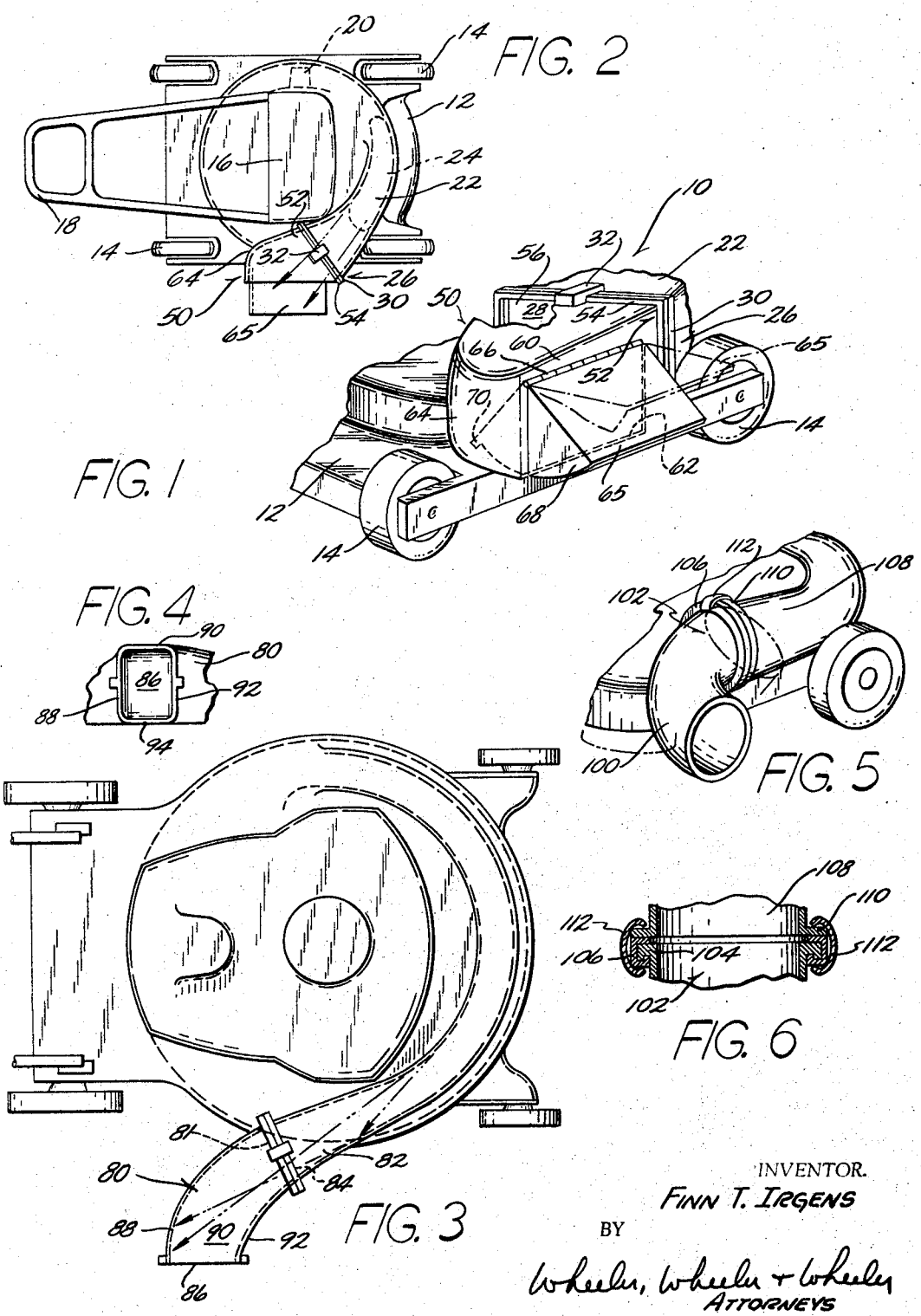
INVENTOR.
FINN T. IRGENS
BY
Wheeler, Wheeler + Wheeler
ATTORNEYS

United States Patent Office 3,420,041
Patented Jan. 7, 1969

3,420,041
LAWN MOWER
Finn T. Irgens, Milwaukee, Wis., assignor to Outboard Marine Corporation, Waukegan, Ill., a corporation of Delaware
Filed July 12, 1965, Ser. No. 471,375
U.S. Cl. 56—25.4     3 Claims
Int. Cl. A01d 35/26

ABSTRACT OF THE DISCLOSURE

A rotary mower having the usual generally circular housing for its blade and provided with a discharge chute in the form of an inverted channel initially conforming in arc to the housing and then extending tangentially therefrom in a rearward and outward direction is provided with clamp means for a fitting having a wall portion positioned to intercept material discharged from said chute and curved oppositely to the curvature of the housing and leading arcuately to a lateral opening controlled for selective windrowing or dispersion of grass clippings by means of a shield having a lateral web and having a friction-hinged connection with said chute at the top of said discharge opening.

---

This invention relates to rotary lawn mowers, and more particularly, to discharge arrangements for rotary lawn mowers.

The principal object of the present invention is to provide a rotary lawn mower having a grass discharge arrangement whereby foreign particles such as stones, wood pieces or other hard or solid objects are deflected in a direction generally toward the ground and at a decreased velocity to avoid injury either to persons or property. In accordance with the invention, the rotary lawn mower includes a housing having an opening and a discharge chute communicating with the opening. A deflector means is removably attached to the discharge chute, or if desired, made an integral part of the discharge chute. The deflector means includes one or more surfaces which are disposed to interfere with the particle travel from the discharge chute, whereby the particles exiting from the discharge chute on various different trajectories will strike at least one of the surfaces and be diverted toward the ground at a decreased velocity.

Another object of the present invention is to provide a lawn mower having deflector means which can be adjustably positioned to selectively afford grass windrowing and grass dispersal.

Other objects and advantages will become apparent from the following description and accompanying drawings in which:

FIGURE 1 is a perspective of a rotary lawn mower incorporating various of the features of the invention;

FIGURE 2 is a plan view of the lawn mower shown in FIGURE 1;

FIGURE 3 is a fragmentary, plan view of a lawn mower embodying another form of the invention;

FIGURE 4 is a side, elevational view, on a reduced scale, of a portion of the lawn mower shown in FIGURE 3;

FIGURE 5 is a fragmentary, perspective view of a lawn mower incorporating still another form of the invention; and FIGURE 6 is a sectional view of a portion of the lawn mower shown in FIGURE 5.

Shown in the drawings is a rotary lawn mower 10 including a housing or frame 12, wheels 14, an engine 16, a handle 18, and a cutting blade 20. The housing 12 includes a discharge chute 22 which can be formed as an integral or separate part of the housing 12 and which defines a discharge passageway for the discharge of grass clippings cut by the mower 10.

The discharge chute 22 basically comprises an inverted channel disposed generally tangentially of part of the blade 20. The discharge chute 22 communicates with an opening 24 in the housing 12 and upwardly deepens from the opening 24 toward a discharge end 26 which includes a discharge opening 28. The lateral sweep of the blade 20 during advance of the housing will lift and project grass clippings into the discharge chute 22 and out the discharge opening 28.

The outlet end 26 of the discharge chute 22 conventionally includes means for mounting thereon a grass catching bag (not shown.) In the disclosed construction, said mounting means includes a flange 30 and suitable fastening means in the form of clamps 32 for removably connecting a grass catching bag (not shown).

Solid particles such as stone, wood pieces, or other hard objects can be projected from the mower 10 at a high velocity and can seriously injure or damage both persons and property. Use of the lawn mower 10, as thus far described without a grass catching bag, as for example, when dispersing the grass clippings, is generally undesirable and dangerous unless means are provided for harmlessly deflecting particles projected through discharge chute 22.

The present invention contemplates deflector means disposed on the discharge chute 22 for diverting or interfering with particles discharged or projected therefrom. The deflector means includes adjustable means for selectively controlling the direction of discharge of grass clippings to afford grass windrowing or grass dispersal. In one embodiment of the invention, the deflector means includes a housing 50 removably attached to the outlet end 26 of the discharge chute 22. The housing 50 includes an attaching end 52 having a flange 54 and an opening 56 which generally conforms in configuration to the discharge opening 28 of the discharge chute 22. Any suitable means can be employed for removably attaching the housing 50 to the discharge chute 22. For example, if the mower is adapted for use with a grass catching bag, the existing clamps 32 can be employed to securely hold the flanges 30 and 54 together. Otherwise, clamps or other suitable fastening means (not shown) can be carried on the housing 50 or discharge chute 22 to provide a readily attachable unit.

The housing 50 includes a flat wall portion 60 having an opening 62 and an arcuate wall portion 64. The opening 62 generally extends to the end of the flat wall portion 60 adjacent to the arcuate wall portion 64 to facilitate unimpeded discharge of grass clippings. In the embodiment shown in FIGURE 1, the flat wall portion 60, as well as the opening 62, is disposed in parallel relation to the direction of travel of the mower 10 and generally perpendicular to the ground line.

A shield or door 65, which is generally coextensive with the opening 62, is adjustably, swingably connected to the flat wall portion 60 by means of a friction hinge 66, which hinge also serves to hold the shield in a given position. The shield 65 is selectively swingable to, and frictionally retainable in, any position between a fully closed position covering the opening 62 (as shown in phantom lines in FIGURE 1) and a fully open position angularly displaced position about 90 degrees from the fully closed position. In FIGURE 1, the shield 65 is shown in an intermediate position. While a friction hinge 66 is employed to hold the shield 65 in a given position, any other suitable holding means can be employed for this purpose. The shield 65 is prevented from swinging through an angle of more than 90 degrees by means of a web 68 having a finger 70 which engages the inner surface of the housing wall portion 60 when the shield 65 is in the fully open position.

The housing 50 and shield 65 are dimensioned and arranged so as to interfere with particles exiting from the discharge chute 22, which particles will strike either of the housing 50, the shield 65, or web 68. For example, as shown best in FIGURE 2, the arcuate wall portion 64 of the housing 50 will interfere with some of the particles projected from the discharge chute 22. Since the opening 62 is generally elevated relative to ground line, the particles attempting to escape through the opening 62 must assume an ascending trajectory relative to the ground line. In this event, the shield 65, in any selected position, and the flat wall portion 60 will effectively interfere with the particles which avoid collision with the arcuate wall portion 64. A small number of particles may travel on a trajectory which avoids the shield 65, the flat wall portion 60, and arcuate wall portion 64, as by passing through the opening 62 and between the shield 65 and the flat wall portion 60. In this event, the web 68 effectively interferes with those particles. Therefore, the housing 50, the shield 65 and the web 68 effectively provide a barrier which is generally transverse to the discharge opening 28 so as to interfere with the particle travel and still afford a minimal amount of restriction to the smooth, generally unimpeded discharge of grass clippings. Use of the web 68 as an interfering surface can be eliminated by extending the arcuate wall portion 64 in a direction laterally of the lawn mower 10.

Particles striking the various interfering parts of the housing 50 can lose energy, and as a result velocity, by being partially or totally destroyed, or by denting the housing.

In an alternative construction, shown in FIGURES 3 and 4, the deflector means includes an arcuately-shaped member or conduit 80 which is removably attached to a discharge chute 82 adjacent a discharge opening 84 by suitable, releasable, fastening means (similar to those previously described).

The conduit 80 has an inlet opening 81 which is generally of the same cross sectional configuration as the discharge opening 84. The cross section of the conduit 80 generally increases toward an outlet opening 86. Particles discharged from the discharge chute 82 will strike one or more of the surfaces of the wall portions 88, 90, 92 and 94 before passing out the opening 86. The conduit 80 can be detached from the discharge chute 82 and selectively positioned to afford grass windrowing or grass dispersal. The wall portions 88, 90, 92 and 94 provide effective interfering surfaces in any selected position of the conduit 80.

In another alternative construction, shown in FIGURES 5 and 6, the deflector means comprises an arcuately-shaped conduit or member 100 having an annular attaching end 102. The end 102 is provided with an annular flange 104 and a corresponding annular mounting ring 106. The conduit 100 is turnable relative to the mounting ring 106. The end 102 is clamped to a discharge chute 108 also having a complementary annular flange 110 by means of clamps 112. The wall of the conduit 100 provides an interfering surface (as previously described) for all particles projected from discharge chute 108. Also, the conduit 100 can be selectively positioned, as by rotating the conduit 100 relative to the discharge chute 108 (as shown in phantom lines in FIGURE 5), to provide various grass discharge conditions such as windrowing and dispersing.

If desired, the deflector means can be unitarily formed as part of the discharge chute of the lawn mower. Also, the deflector means can be adapted for carrying or mounting a grass catching bag.

Various of the features of the invention are set forth in the following claims.

What is claimed is:

1. In a rotary mower the combination with a generally circular blade housing having a discharge chute initially conforming to the arc of the housing and thence extending tangentially in a generally rearward direction, bag clamp means at the end of said chute, and a fitting connected by said clamp means to the chute and having a wall portion curving laterally on an arc opposite to that of the housing to intercept and deflect material from the chute and leading to a laterally directed discharge opening with which said fitting is provided, and a shield extending across the discharge opening and having a hinge connecting it with said fitting at the top of said opening.

2. A combination according to claim 1 in which the hinge comprises a friction hinge adapted to hold said shield in the position to which it is manually set, for windrowing or dispersion of clippings and interception of material deflected to said opening by the arcuately curved wall of the fitting.

3. A combination according to claim 2 in which said shield has a lateral web extending into said opening and provided with a stop lug engageable with the fitting adjacent the lower margin of the opening for limiting the range of hinged movement of the shield.

References Cited

UNITED STATES PATENTS

| | | | |
|---|---|---|---|
| 2,675,661 | 4/1954 | Titzer | 56—25.4 |
| 2,843,991 | 7/1958 | Poehls | 56—25.4 |
| 3,020,693 | 2/1962 | Sears | 56—25.4 |
| 3,118,267 | 1/1964 | Shaw | 56—255 X |
| 3,178,872 | 4/1965 | Swindler | 56—25.4 |
| 3,220,170 | 11/1965 | Smith et al. | 56—255 |
| 3,292,351 | 12/1966 | Larson et al. | 56—25.4 |

ABRAHAM G. STONE, *Primary Examiner.*

P. A. RAZZANO, *Assistant Examiner.*